(12) United States Patent
Tamas et al.

(10) Patent No.: US 9,912,124 B2
(45) Date of Patent: Mar. 6, 2018

(54) SPARK PLUG CONNECTOR AND INTERFERENCE-SUPPRESSION RESISTOR FOR AN IGNITION SYSTEM

(71) Applicant: BorgWarner Ludwigsburg GmbH, Ludwigsburg (DE)

(72) Inventors: Eduard Tamas, Lunca de Jos (RO); Martin Sackmann, Benningen (DE); Manfred Adolf, Schwaikheim (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 280 days.

(21) Appl. No.: 14/809,222

(22) Filed: Jul. 26, 2015

(65) Prior Publication Data

US 2016/0036203 A1     Feb. 4, 2016

(30) Foreign Application Priority Data

Jul. 31, 2014   (DE) ..................... 10 2014 110 872
Aug. 1, 2014    (DE) ..................... 10 2014 110 962

(51) Int. Cl.
| F23Q 3/00 | (2006.01) |
| H01T 13/05 | (2006.01) |
| H04B 15/02 | (2006.01) |
| F02P 3/04 | (2006.01) |

(52) U.S. Cl.
CPC ............ H01T 13/05 (2013.01); H04B 15/02 (2013.01); *F02P 3/04* (2013.01)

(58) Field of Classification Search
USPC ....................................................... 361/253
See application file for complete search history.

(56) References Cited

U.S. PATENT DOCUMENTS

| 3,251,010 | A | * | 5/1966 | Kirchgessner | .......... | H01T 13/05 |
| | | | | | | 333/177 |
| 4,105,077 | A | | 8/1978 | Seifert, Jr. | | |
| 4,191,155 | A | * | 3/1980 | Nishio | ................ | H04B 15/025 |
| | | | | | | 123/633 |
| 4,284,057 | A | * | 8/1981 | Mayer | ..................... | F02P 7/025 |
| | | | | | | 123/596 |
| 4,590,536 | A | * | 5/1986 | Gerry | ...................... | H01T 13/05 |
| | | | | | | 123/633 |
| 5,590,637 | A | * | 1/1997 | Motodate | ................ | F02B 61/02 |
| | | | | | | 123/634 |
| 5,706,792 | A | * | 1/1998 | Boyer | ..................... | F02P 13/00 |
| | | | | | | 123/169 PA |
| 6,679,236 | B2 | * | 1/2004 | Skinner | .................. | F02P 13/00 |
| | | | | | | 123/634 |

(Continued)

FOREIGN PATENT DOCUMENTS

| DE | 885 330 | 8/1953 |
| DE | 12 16 613 | 5/1966 |

(Continued)

*Primary Examiner* — Ronald W Leja
(74) *Attorney, Agent, or Firm* — Bose McKinney & Evans LLP

(57) ABSTRACT

Described is a spark plug connector having an interference-suppression resistor which has a wire winding on a coil body. According to this disclosure, it is provided that the coil body carries an electrical resistor that contacts the wire winding and is connected in parallel thereto. In addition, an interference-suppression resistor for an ignition system of an internal combustion engine is described.

10 Claims, 3 Drawing Sheets

(56) References Cited

U.S. PATENT DOCUMENTS

| | | | |
|---|---|---|---|
| 8,861,176 B2 | 10/2014 | Masuzawa | |
| 2002/0129950 A1* | 9/2002 | Funk | F02P 9/002 |
| | | | 174/28 |
| 2008/0278884 A1* | 11/2008 | Skinner | F02P 3/055 |
| | | | 361/263 |
| 2016/0036203 A1* | 2/2016 | Tamas | H01T 13/05 |
| | | | 361/253 |

FOREIGN PATENT DOCUMENTS

| | | |
|---|---|---|
| DE | 41 06 580 A1 | 10/1992 |
| DE | 295 01 063 U1 | 3/1995 |
| DE | 10 2012 209 454 A1 | 12/2012 |
| WO | WO 2013/080013 A1 | 6/2013 |

\* cited by examiner

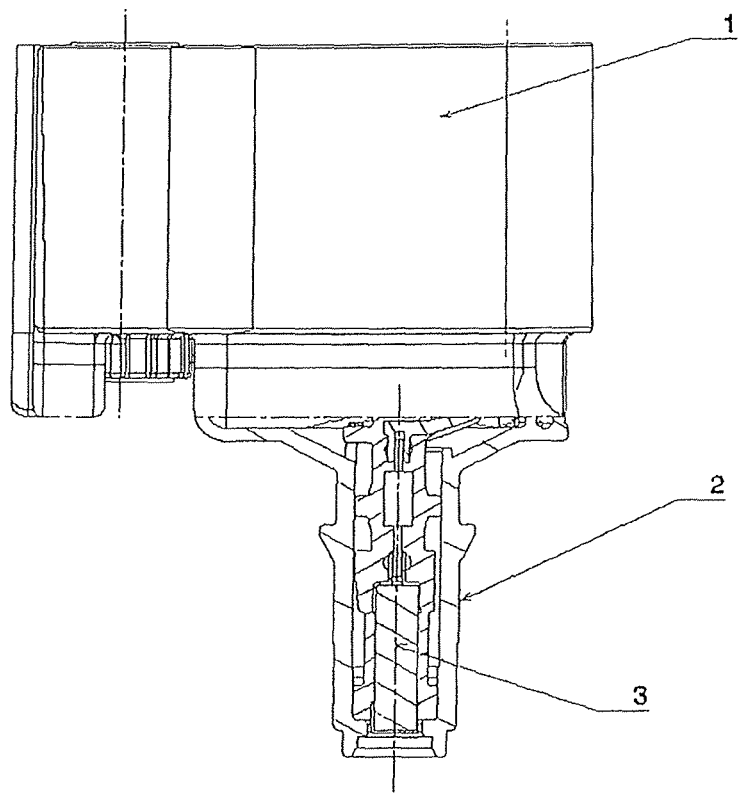
Fig.: 1
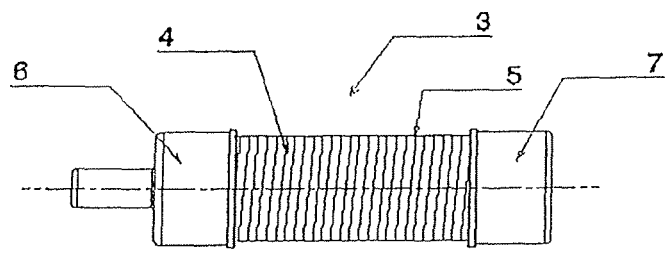
Fig.: 2

SPARK PLUG CONNECTOR AND INTERFERENCE-SUPPRESSION RESISTOR FOR AN IGNITION SYSTEM

RELATED APPLICATIONS

This application claims priority to DE 10 2014 110 872.8, filed Jul. 31, 2014, and also claims priority to DE 10 2014 110 962.7, filed Aug. 1, 2014, both of which are hereby incorporated herein by reference in their entireties.

BACKGROUND

The invention relates to a spark plug connector as generally known from WO 2013/080013 A1.

Ignition systems of internal combustion engines must include interference-suppression resistors for reasons of electromotive compatibility. Interference-suppression resistors usually are configured as a wire winding on a coil body. The coil body can contain ferrite for improving the attenuation of interfering signals. Such an interference-suppression resistor is known from DE 41 06 580 A1.

In modern ignition systems, interference-suppression resistors are integrated in the spark plug connector. The spark plug connector itself can be integrated in the housing of the ignition coil or can be designed as a separate component.

SUMMARY

This disclosure teaches a way how attenuation of interfering signals in ignition systems for internal combustion engines can be improved, in particular at higher frequencies.

In the case of the interference-suppression resistor of a spark plug connector according to this disclosure, the coil body carries an electrical resistor that is connected in parallel to the wire winding. This resistor can be designed, for example, as an electrically conductive coating, such as a conductive polymer layer. Another possibility is that the resistor is integrated in the coil body, for example in such a manner that the material of the coil body contains electrically conductive additives, for example, metal particles or carbon particles.

Since an electrical resistor is connected in parallel to the wire winding, parasitic capacitances between adjacent windings of the wire winding can be short-circuited. In this manner, attenuation at high frequencies above the resonant frequency can be substantially improved.

In an advantageous configuration of this disclosure, the resistance connected in parallel can be between twenty times and a hundred times the electrical resistance of the wire winding, preferably between fifty times to a hundred times the resistance of the wire winding. The electrical resistance connected in parallel is preferably between 20 to 500 kOhm m/m sheet resistance, in particular between 20 to 250 kOhm m/m sheet resistance. If the resistance connected in parallel is less than twenty times of the resistance of the wire winding, in particular less than 20 kOhm m/m sheet resistance, attenuation of lower frequencies is increasingly affected. If the attenuation is more than two hundred times the resistance of the wire winding, the parasitic capacitances of adjacent wire windings are increasingly less reduced and attenuation at high frequencies therefore can hardly be improved. If the attenuation is more than 500 kOhm m/m sheet resistance, the attenuation at high frequencies can hardly be improved.

The electrically conductive coating can be applied on the coil body before the wire winding is wound onto the coil body. It is also possible to apply the electrically conductive coating onto the wire winding after it is wound onto the coil body. In both cases, the coating can also serve for fixing the wire winding on the coil body, for example by applying the coating in the form of a lacquer or other coatings.

The electrically conductive coating is preferably a polymer, for example a resin. The polymer can contain conductive particles, for example metal particles or carbon particles. Also, an intrinsically conductive polymer can be used for the coating, such as polypyrrole, which has good electrical conductivity even without additives.

The interference-suppression resistor can have an electrical resistance of 500 Ohm to 5 kOhm.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 1 shows a schematic illustration of an ignition coil with a spark plug connector that contains an interference-suppression resistor;

FIG. 2 shows a schematic illustration of the interference-suppression resistor;

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

The ignition coil illustrated in FIG. 1 has a housing that forms a spark plug connector 2. An interference-suppression resistor 3, which is illustrated in FIG. 2, is arranged in the spark plug connector 2. A spark plug can be plugged into the bushing formed by the spark plug connector 2 and thus can be connected to the ignition coil.

The interference-suppression resistor 3 has a coil body on which a wire winding 4 is wound. The coil body can be, for example, a fiberglass compound containing ferrite powder for increasing the inductance. The wire winding 4 can be contacted via contact caps 6, 7 slid on at the ends of the coil body. Such an interference-suppression resistor can be produced in a cost-effective manner by winding a blank uncoated wire onto a carrier made of a fiberglass compound. The carrier together with the wire wound thereon is then cut into pieces of the desired length and the wire is contacted by sliding on the contact caps 6, 7.

Figure 3:
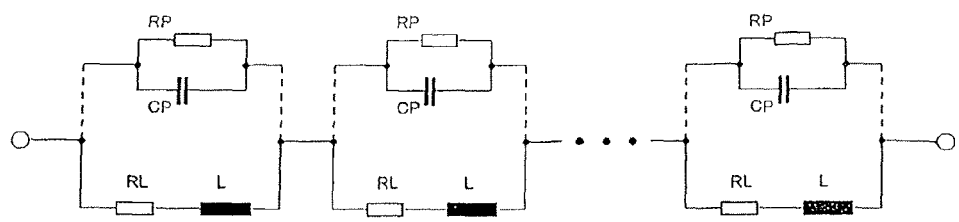
FIG. 3 shows an equivalent circuit of the interference-suppression resistor.

The wire winding 4 has an electrical resistance RL and together with the coil body it forms an inductor L. An electrical resistor RP is connected in parallel to the wire winding 4. The resistor RP short-circuits parasitic capacitances CP between adjacent windings of the wire winding 4. FIG. 3 shows an equivalent circuit of the interference-suppression resistor 3.

Figure 4:
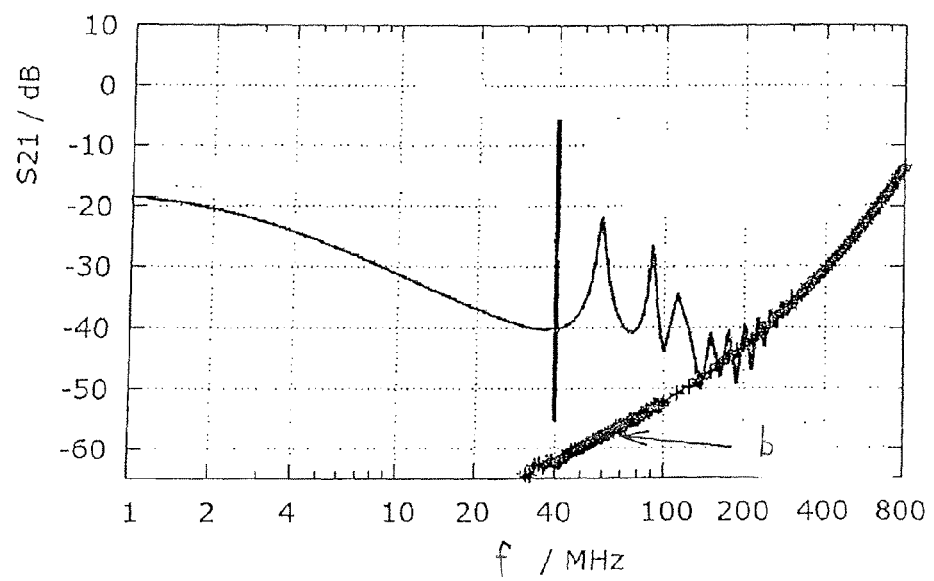
FIG. 4 shows the insertion loss of the interference-suppression resistor as a function of the frequency without a resistor connected in parallel to the winding.
Figure 5:
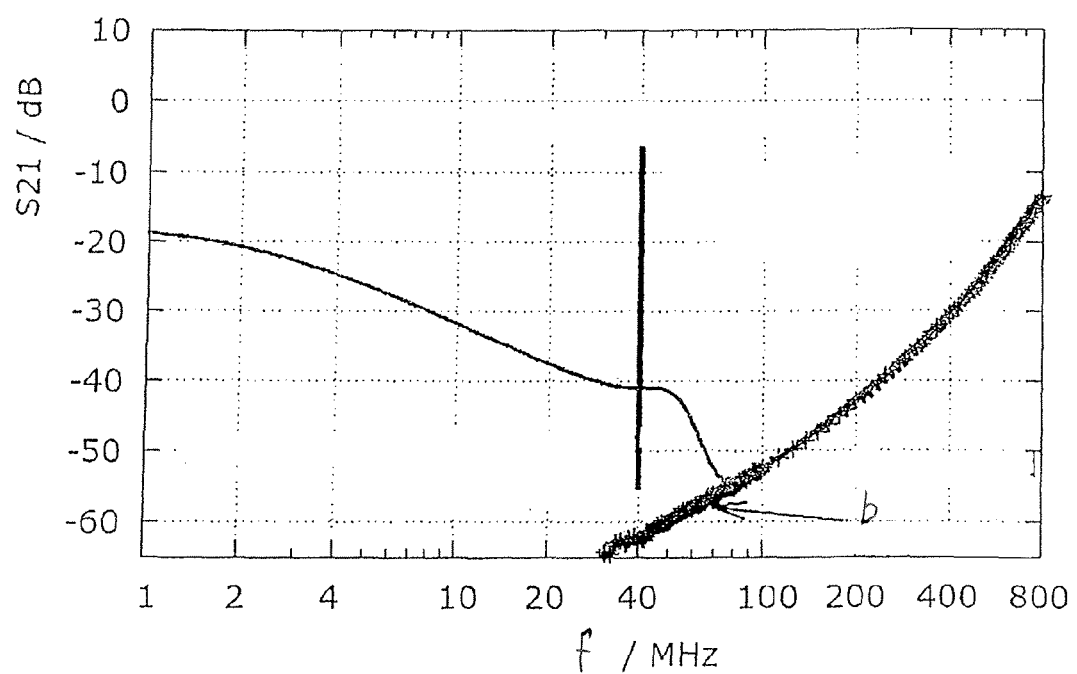
FIG. 5 shows the insertion loss of the same interference-suppression resistor as a function of the frequency with a resistor connected in parallel to the winding.

FIG. 4 shows the insertion loss of an interference-suppression resistor 3 in decibel as a function of the frequency in MHz without a resistor RP connected in parallel to the wire winding 4. FIG. 5 shows the insertion loss of an interference-suppression resistor 3 in decibel as a function of the frequency in MHz with a resistor RP connected in parallel to the wire winding 4. In each of the FIGS. 4 and 5, the background level b of the measuring apparatus used is also plotted. It is apparent that in particular at higher frequencies above the resonant frequency, which lies at 40 MHz in the example shown, the attenuation is significantly improved by the resistor RP connected in parallel to the wire winding.

As is shown in FIG. 4, without the resistor RP connected in parallel and when using a conventional interference-suppression resistor, there are peaks above the resonant frequency with relatively poor attenuation. As shown in FIG. 5, attenuation can be significantly improved in these ranges by the resistor RP connected in parallel without the attenuation at low frequencies becoming notably worse.

The resistor RP connected in parallel to the wire winding 4 can be formed by an electrically conductive coating, for example. Such a coating can be a polymer, for example. Apart from intrinsically conductive polymers, it is also possible to use polymers that were rendered conductive by admixing graphite or metal particles. Suitable are in particular synthetic resins with electrically conductive admixtures. The electrically conductive coating can be applied before or after winding the wire winding 4 and can fix the wire winding 4 on the coil body.

It is also possible to integrate the resistor RP connected in parallel to the wire winding 4 in the coil body, for example by admixing carbon fibers or other conductive particles, for example graphite or metal power, to the material of the coil body. In this case too, the resistor RP connected in parallel to the wire winding 4 can electrically contact and short-circuit each winding of the wire winding 4.

The electrical resistance RP connected in parallel to the wire winding 4 can be between twenty times and two hundred times the resistance of the wire winding 4. Preferably, the electrical resistance is fifty times to hundred times the resistance of the wire winding 4. If the resistance RP connected in parallel is too low, then the attenuation is affected at low frequencies since the inductance of the interference-suppression resistor 3 is reduced too drastically. If the resistance RP connected in parallel is too high, the parasitic capacitances CP between adjacent windings of the wire winding 4 are not sufficiently short-circuited in order to be able to notably improve the attenuation at high frequencies.

The wire winding of the interference-suppression resistor 3 can have a resistance of 500 Ohm to 5 kOhm, for example.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A spark plug connector, comprising:
   an interference-suppression resistor having a wire winding on a coil body; and
   the coil body carrying an electrical resistor that is connected in parallel to the wire winding, wherein the electrical resistor electrically and physically contacts each winding of the wire winding, whereby interfering signals in the ignition system can be attenuated.

2. The spark plug connector according to claim 1, wherein the electrical resistor is formed by an electrically conductive coating.

3. The spark plug connector according to claim 1, wherein the electrical resistor is an electrically conductive polymer layer.

4. The spark plug connector according to claim 3, wherein the polymer layer contains electrically conductive particles.

5. The spark plug connector according to claim 1, wherein the electrical resistor is formed by a conductive admixture to the material of the coil body.

6. The spark plug connector according to claim 1, wherein the coil body is a fiberglass compound.

7. The spark plug connector according to claim 1, wherein the electrical resistor has a resistance of between twenty times and two hundred times the electrical resistance of the wire winding.

8. The spark plug connector according to claim 1, comprising a spark plug with a housing on which the spark plug connector is formed as a bushing.

9. An interference-suppression resistor for an ignition system of an internal combustion engine, comprising:
   a wire winding wound onto a coil body; and
   a resistor connected in parallel to the wire winding;
   wherein the resistor short-circuits parasitic capacitances between adjacent windings of the wire winding and electrically contacts each loop of the wire winding, whereby interfering signals in the ignition system can be attenuated.

10. An interference-suppression resistor for an ignition system of an internal combustion engine, comprising:
    a wire winding wound onto a coil body; and
    a resistor connected in parallel to the wire winding;
    wherein the resistor short-circuits parasitic capacitances between each adjacent winding of the wire winding, whereby interfering signals in the ignition system can be attenuated.

* * * * *